United States Patent [19]

Onogi

[11] Patent Number: 4,475,802
[45] Date of Patent: Oct. 9, 1984

[54] APPARATUS FOR DETERMINING SHUTTER SPEED ADAPTED FOR A PHOTOGRAPHING APPARATUS IN A MICROSCOPE

[75] Inventor: Kenji Onogi, Yokohama, Japan

[73] Assignee: Nippon Kogaku K.K., Tokyo, Japan

[21] Appl. No.: 550,640

[22] Filed: Nov. 10, 1983

Related U.S. Application Data

[63] Continuation of Ser. No. 296,141, Aug. 25, 1981, abandoned.

[30] Foreign Application Priority Data

Aug. 30, 1980 [JP] Japan .............................. 55-120216

[51] Int. Cl.³ .............................................. G03B 7/08
[52] U.S. Cl. .................................. 354/456; 354/464; 354/79
[58] Field of Search ................... 354/456, 62, 79, 464

[56] References Cited

U.S. PATENT DOCUMENTS

| | | | |
|---|---|---|---|
| 2,450,288 | 9/1948 | Maisch | 354/60 R |
| 3,106,129 | 10/1963 | Frenk et al. | 354/79 |
| 3,130,634 | 4/1964 | Kropp et al. | 354/50 |
| 3,386,358 | 6/1968 | Kropp | 354/51 |
| 3,872,303 | 3/1975 | Jakubowski et al. | 354/79 |
| 3,999,060 | 12/1976 | Skagerlund | 250/214 AG |
| 4,048,510 | 9/1977 | Clarke et al. | 250/214 AG |
| 4,318,599 | 3/1982 | Elger | 354/79 |

FOREIGN PATENT DOCUMENTS 1461387 1/1977 United Kingdom ........ 250/214 AG

OTHER PUBLICATIONS

"Automatic Gain Control", W. W. Hardin, IBM Tech. Disclosure, vol. 4, No. 12, May 1962.

Primary Examiner—Russell E. Adams
Attorney, Agent, or Firm—Fitzpatrick, Cella, Harper & Scinto

[57] ABSTRACT

A shutter speed determining apparatus adapted for a photographing apparatus in a microscope includes a photo multiplier as photoelectric element. The photo multiplier receives light transmitted through an objective lens and transforms the light into an electric signal. The output signal from the photo multiplier is compared with a reference signal which has two different levels, high and low. When the output signal is higher than the high reference level, a first signal is produced and when it is lower than the lower reference level, a second signal is produced. When the first signal is produced, the sensitivity of the photo multiplier is decreased. On the contrary, when the second signal is produced, the sensitivity is increased up. A correction coefficient is produced in accordance with the sensitivity of the photo multiplier. An arithmetic unit determines a proper shutter speed from the output of the photo multiplier and, in addition, the output of correction coefficient output circuit.

4 Claims, 6 Drawing Figures

APPARATUS FOR DETERMINING SHUTTER SPEED ADAPTED FOR A PHOTOGRAPHING APPARATUS IN A MICROSCOPE

This is a continuation of application Ser. No. 296,141 filed Aug. 25, 1981 now abandoned.

BACKGROUND OF THE INVENTION

1. Field of the Invention

The present invention relates to an exposure control apparatus adaptable for a photographing apparatus in a microscope. More particularly, the present invention relates to a shutter speed determining apparatus in which a photo multiplier is used as a photometrical photo-electric element and a proper shutter speed is determined based on the photo-electrically converted signal from the photo multiplier.

2. Description of Prior Art

In the art of still cameras there is already known exposure control apparatus which can automatically determine a proper shutter speed by means of a signal obtained by photoelectric conversion of the light transmitted through an object lens.

Recently, many attempts have been made to develop such automatic exposure control apparatus adaptable also for a photographing apparatus associated with a microscope. However, development of such automatic shutter speed determining apparatus adaptable for a microscope photographing apparatus involves some difficulties. The intensity of light coming from the sample piece in a microscope varies from one sample to another in a very broad range ranging from very dark to fair by bright. To achieve automatic photographing of such objects widely different one from another in brightness, man has to select at first such photo-electric element which has a very wide photometric sensitivity range. Semiconductor photoelectric elements such as photo cells have an advantage of being small in size. However, they have no sensitivity to very dark light such as that coming from a fluorescent sample. Therefore, use of a photo multiplier must be considered. However, this also involves some problems. Those photo multipliers which have a sufficiently broad photometric range to cover from very dark to fair by bright are generally large in size and also expensive. Therefore, they are unsuitable for use in a photographing apparatus of a microscope. Use of a small size photo multiplier has a problem of inability to cover a wide photometric range. To cover a wide photometric range with a small size photo multiplier, it is required to make variable the sensitivity of the photo multiplier. In other words, the sensitivity of such photo multiplier has to be switched over to change the photometric range from one to another thereby covering a wide photometric range as a whole. Hitherto, setting of sensitivity for such small photo multiplier, for instance, in a photometer has been carried out manually. However, when such small size photo multiplier is used in a photographing apparatus for a microscope, it is desirable that the sensitivity setting can be carried out automatically.

SUMMARY OF THE INVENTION

Accordingly, it is an object of the invention to provide an exposure control apparatus adaptable for a photographing apparatus in a microscope in which a photo multiplier is used as photometrical element and in which the sensitivity of the photo multiplier can be set automatically.

It is another object of the invention to provide such exposure control apparatus in which the sensitivity of the photo multiplier can be switched over automatically and also an automatic correction to exposure value can be carried out in link with the sensitivity switching-over operation.

Other and further objects, features and advantages will appear more fully from the following detailed description taken in connection with the accompanying drawings.

DESCRIPTION OF PREFERRED EMBODIMENTS

The sensitivity of a photo multiplier may be changed by two factors, applied voltage and detection resistance. For the following embodiments, we have prepared two different applied voltages, high voltage and low voltage and two different detection resistances, high resistance and low resistance to stepwise change the sensitivity. To set three steps of sensitivity, I have made three different combinations of voltage and resistance as follows:

high voltage-low resistance, low voltage-high resistance and low voltage-low resistance.

Figure 1:
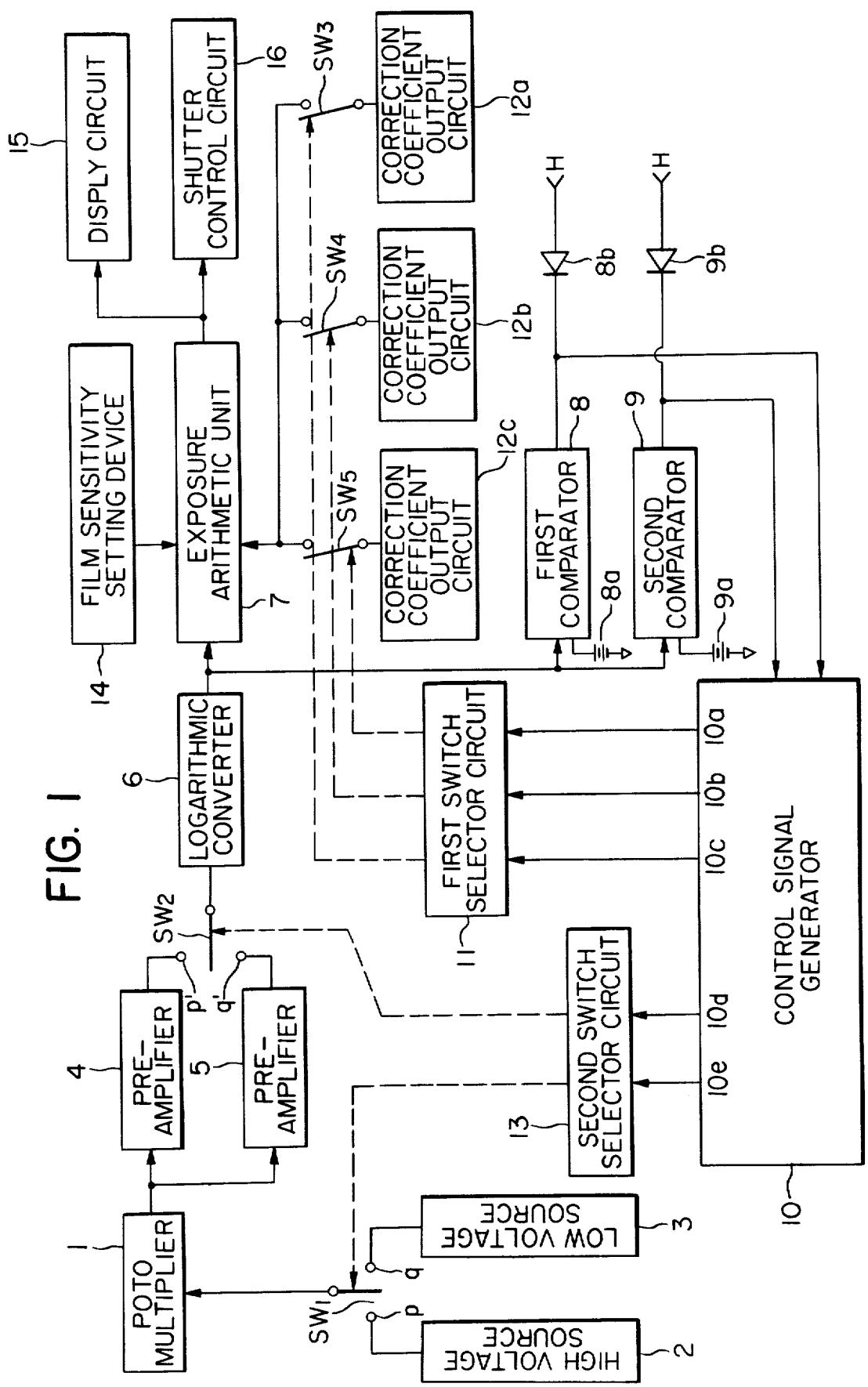
FIG. 1 is a block diagram showing an embodiment of the invention.

Referring now to FIG. 1 showing an embodiment of the invention, a photo multiplier is designated by 1 and a changeover switch by SW1. The photo multiplier 1 can be connected to a high voltage source 2 or a low voltage source 3 selectively through the change-over switch SW1. The output of the photo multiplier 1 is introduced into pre-amplifiers 4 and 5. The pre-amplifier 4 has a larger detection resistance and the other pre-amplifier 5 has a smaller detection resistance. Through a change-over SW2, any selected one of the pre-amplifiers 4 and 5 can be connected to a logarithmic converter 6 whose output is connected to an exposure arithmetic unit 7 as well as to first and second comparators 8 and 9. The first comparator 8 is receiving from a battery 8a a voltage $V_H$ determining a certain over-limit and compares the output from the logarithmic converter 6 with the voltage $V_H$. When the former is highter than the latter, the first comparator 8 issues a low level signal L. All other times, it issures a high level signal H. Connected with the output terminal of the first comparator 8 is a light emitting element 8b which is put on when the low level signal is issued from the first comparator 8.

The second comparator 9 is receiving from a battery 9a a voltage $V_L$ determining a certain under-limit and compares the output from the logarithmic converter 6 with the voltage $V_L$. When the former is lower than the latter, the second comparator 9 issues a low level signal L. All other times it issues a high level signal H. Connected with the output terminal of the second comparator 9 is a light emitting element 9b which is put on when the output of the second comparator 9 is a low level signal.

Designated by 10 is a control signal generator to which the outputs of the first and second comparators 8 and 9 are applied. According to High and Low of the output levels from the comparators 8 and 9, the control signal generator 10 produces a high level signal at the corresponding one of the first, second and third output terminals 10a, 10b and 10c. These three output terminals are connected to a first switch selector circuit 11. The first switch selector circuit 11 generates a signal for turning on switch SW3, SW4 or SW5 when the control signal generator 10 has a high level signal at any one of its output terminals 10a, 10b and 10c. Which of switches SW3, SW4 and SW5 is to be turned on by the selection signal is determined by which of the output terminals 10a, 10b and 10c has the high level signal at that time. Concretely, this may be achieved by using normally open switches as the swithces SW3, SW4 and SW5 and forming the first switch selector 11 from three switching transistors and coils. The bases of the three switching transistors are connected to the output terminals 10a, 10b and 10c and their collectors are connected to the coils respectively so as to form relays by switches SW3, SW4 and SW5 and coils.

The switches SW3, SW4 and SW5 are connected, at their one ends, to correction coefficient output circuits 12a, 12b and 12c and, at the other ends, to the exposure arithmetic unit 7 respectively. The first, second and third correction coefficient output circuits 12a, 12b and 12c correspond to the first, second and third output terminals 10a, 10b and 10c of the control signal generator 10 respectively.

As previously noted, in the shown embodiment, the sensitivity of the photo multiplier 1 is stepwise changed through three steps. In the respective steps, the output of logarithmic converter 6, therefore, changes within a same level range previously given. However, the exposure arithemtic unit 7 is required to determine a proper shutter speed on the basis of absolute quantity of light really incident on the photo multiplier 1. For this purpose, the correction coefficient output circuits 12a, 12b and 12c are provided. The circuits 12a, 12b, 12c deliver to the exposure arithmetic unit 7 such signal by means of which a certain determined level is added to the output from the logarithmic converter 6 so as to convert the output to a value corresponding to the absolute quantity of light incident on the photo multiplier 1. The function of the correction coefficient output circuits 12a, 12b and 12c corresponds to that of a well-known sensitivity correction dial as used, for example, in a single lens reflex camera.

The control signal generator 10 has also fourth and fifth output terminals 10d and 10e from which signals in combination of High level and Low level related to the output signal from the output terminals 10a, 10b, 10c are put out in accordance with High and Low of the output level from the first and second comparators 8 and 9. The fourth and fifth output terminals 10d and 10e are connected to a second switch selector circuit 13. According to the occurring combination of signals from the output terminals 10d and 10e, the second switch selector circuit 13 switches over the change-over switches SW1 and SW2 in the relation shown in the following table, Table 1:

TABLE 1

| 10d | 10e | SW1 | SW2 |
|-----|-----|-----|-----|
| L | L | q | q' |
| H | L | q | p' |
| L | H | p | q' |

This switching may be achieved by using, as SW1 and SW2 switches normally biased toward the terminals q and q' and forming the second switch selector circuit 13 from two switching transistors and coils. In this case, the bases of the transistors are connected to terminals 10d and 10e and their collectors are connected to the coils so that the switches SW1 and SW2 can be connected to terminals p and p' by turn-on of the switching transistors.

The exposure arithmetic unit 7 receives a measured light value from logarithmic converter 6, a correction coefficient from any one of correction coefficient output circuits 12a, 12b, 12c and an information signal of film sensitivity from a film sensitivity setting. Based on these input data, the exposure arithmetic unit 7 carries out an arithmetic operation to determine a proper exposure time which is then put out into a display circuit 15 and a shutter control circuit 16. The exposure time thus determined is displayed on the display 15.

The structure of the control signal generator 10 will be described in detail hereinafter with reference to FIG. 2.

Preferably, the control signal generator must be designed to carry out processing in a fashion of "soft" employing a micro computer. But, in the shown embodiment, the control signal generator 10 is formed in a fashion of "hard".

Figure 2:
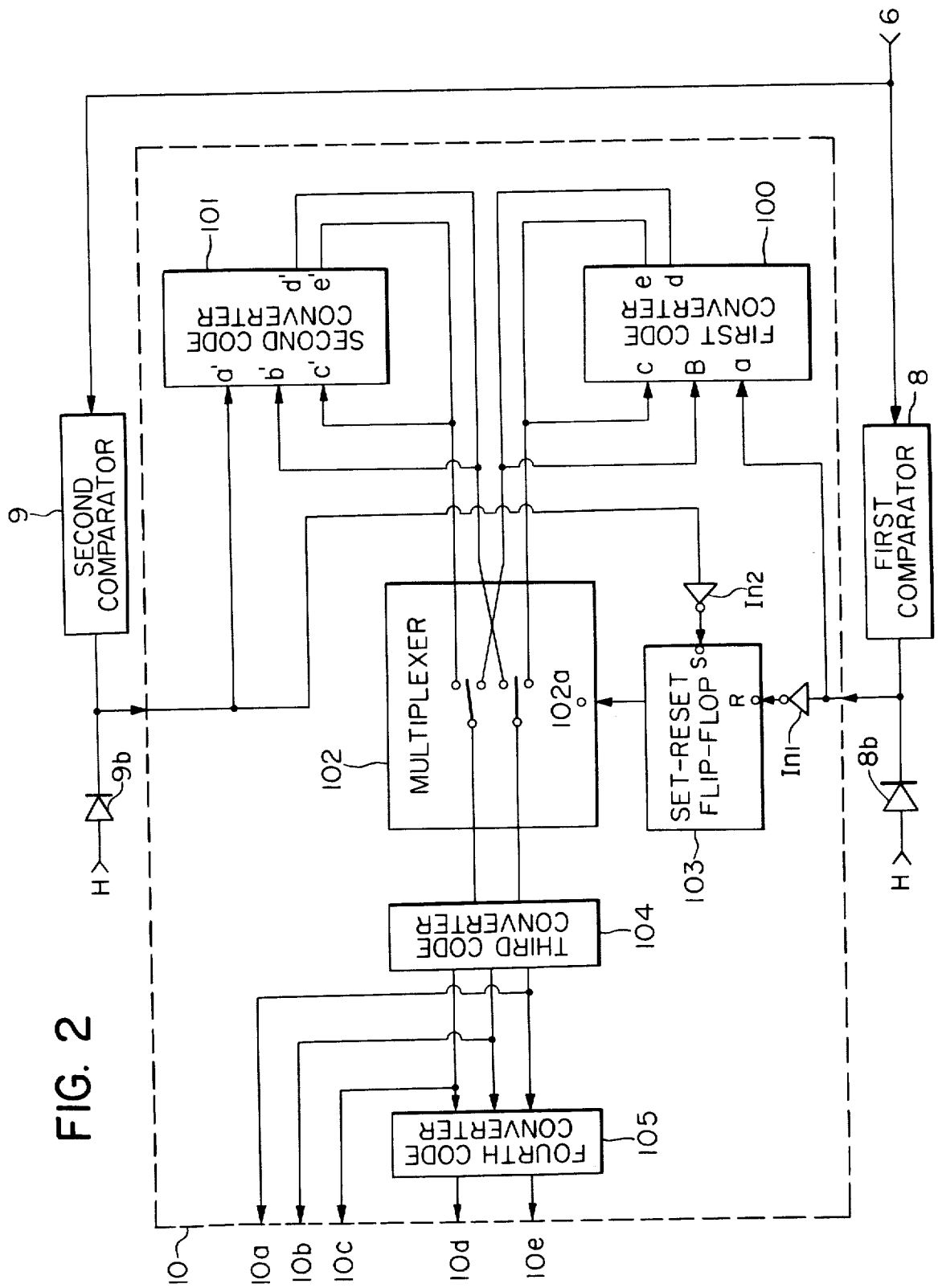
FIG. 2 is a detailed circuit diagram of the control signal generator shown in FIG. 1.
Figure 4:
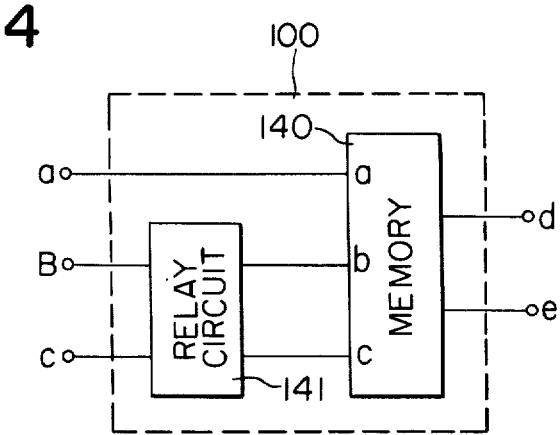
FIGS. 4 and 5 are schematic illustrations of the first and second code converters respectively.

In FIG. 2, a first code converter designated by 100 has three input terminals a, B and C and two output terminals d and e. Applied to the first input terminal a is the output from the first comparator 8. The second and third input terminals B and C are connected to the first and second output terminals d and e respectively. As seen in FIG. 4, the first code converter 100 is constituted by a read possible memory 140 and a delay circuit 141. The memory 140 has three input terminals a, b and c and two output terminals d and e. The memory has also 3-bit input code as address setting data and 2-bit output code at the corresponding address. The delay circuit 141 has two input terminals B and C. The two output terminals of the delay circuit are connected to the input terminals b and c of the memory 140.

The function of the memory 140 in the first code converter 100 is to convert the combination of high level signal H and low level signal L put in the input terminals a, b and c into a 3-bit input code and to convert the combination of 2-bit output signals (output code) corresponding to the input code into output signals appearing at its output terminals d and e in the relation shown in the following table, Table 2:

TABLE 2

| input | | | output | |
|---|---|---|---|---|
| a | b | c | d | e |
| L | L | L | L | L |
| L | H | L | L | L |
| L | L | H | H | L |
| H | L | L | L | L |
| H | H | L | H | L |
| H | L | H | L | H |

Figure 5:
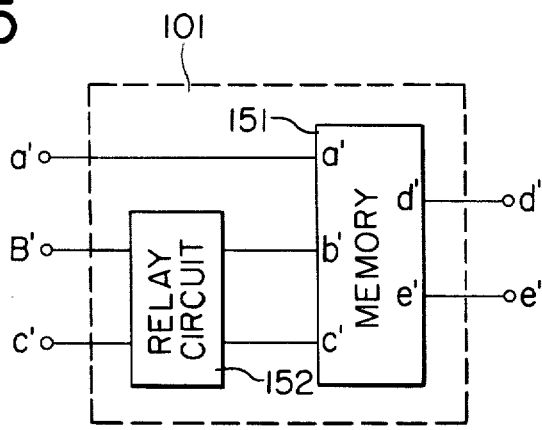

Designated by 101 is a second code converter which, like the first converter 100, has three input terminals a', B' and C' and two output terminals d' and e'. Applied to the first input terminal a' is the output from the second comparator. The second and third input terminals B' and C' are connected to the first and second output terminals d' and e' respectively. As seen in FIG. 5, the second code converter 101 has essentially the same structure as that of the above described first code converter 100. Again, the second code converter 101 is constituted of a read possible memory 151 and a delay circuit 152. The memory 151 has three input terminals a', b' and c' and two output terminals d' and e'. As address setting data, the memory 151 has 3-bit input code and at the corresponding address it has 2-bit output code. The delay circuit 152 has two input terminals B' and C' and its output terminals are connected to the input terminals b' and c' of the memory 151.

The memory 151 in the second code converter 101 converts the combination of high level signal H and low level signal L applied to its input terminals a', b' and c' into 3-bit input code. And the combination of 2-bit output signals (output code) corresponding the input code is converted to form output signals to its output terminals d' and e' in the relation shown in the following table, Table 3.

TABLE 3

| input | | | output | |
|---|---|---|---|---|
| a' | b' | c' | d' | e' |
| L | L | L | H | L |
| L | H | L | L | H |
| L | L | H | L | H |
| H | L | L | L | L |
| H | H | L | H | L |
| H | L | H | L | H |

The function of the relay circuit 141;152 is to delay the transmission of signals from d,e; d',e' to the input terminals b,c; b',c' of the memory 140;151 for a sufficient time to make the circuit controlled by the output terminals d,e; d',e' of the code converter 100;101.

Designated by 102 is a multiplexer having a control terminal 102a. When the signal applied to the control terminal is Low, the multiplexer 102 transmits the output of the first code converter 100 to a third code converter 104. When the signal is High, the multiplexer transmits the output of the second code converter 101 to the third code converter 104. 103 is a set-reset flip-flop which receives, at its reset terminal R, the output of the first comparator 8 through an inverter In1 and, at its set terminal S, the output of the second comparator 9 through inverter In2. In other words, when the output of the first comparator 8 is Low, the flip-flop 103 is reset to allow the output of the first code converter 100 to pass through the multiplexer 102. When the output of the second comparator 9 is Low, the flip-flop is set to allow the output of the second code converter 101 to pass through the multiplexer.

The third code converter 104 converts the output code of the first code converter 100 or of the second code converter passed through the multiplexer 102 into 3-bit code in the relation shown in the following table, Table 4.

TABLE 4

| input | | | output | |
|---|---|---|---|---|
| L | L | H | L | L |
| H | L | L | H | L |

TABLE 4-continued

| input | | | output | |
|---|---|---|---|---|
| L | H | L | L | H |

The outputs of the third code converter 104 are introduced into a fourth code converter 105 and also put out from the control signal generator 10 through terminals 10a, 10b and 10c to apply the outputs to the first switch selector circuit 11. The 3-bit code introduced into the fourth code converter 105 is again converted into 2-bit code in the relation shown in Table 4 and then put out from the code converter 105. The fourth code converter 105 may be, therefore, omitted and the output of the multiplexer 102 may be led directly to the terminals 10d and 10e.

The output of the fourth code converter 105 is put out from the control signal generator through the terminals 10d and 10e and then put into the second switch selector circuit 13 to control switching of the change-over switches SW1 and SW2.

The manner of operation of above apparatus will be described hereinafter with reference to FIG. 3.

For the purpose of explanation, assumption is made that initially the apparatus is in the position in which the first change-over switch SW1 is connected to the terminal q and the second one SW2 to terminal q' so that the photo multiplier 1 is set to the minimum sensitivity. In this position, the outputs appearing at the output terminals 10d and 10e of the control signal generator 10 are both L (see Table 1) and the outputs at the terminals 10a, 10b and 10c are H L L (Table 4). Therefore, switch SW3 is turned on and the first correction coefficient output circuit 12a is in connection with the exposure arithmetic unit 7. Under this state of the circuit, if the output from the logarithmic converter 6 is at a level far lower than the voltage $V_L$ of the second comparator 9, for instance, at the level of Va shown in FIG. 3, then the output of the first comparator 8 becomes H and that of the second comparator 9 becomes L. Consequently, the light emitting element 9 is put on to give warning that the output of the logarithmic converter 6 is lower than the under-limit $V_L$. In this case, the flip-flop 103 is set to allow the output code of the second code converter 101 to pass through the multiplexer 102. When the output code from the second code converter is LL, the output of the control signal generator 101 remains unchanged. At this time, the memory 141 of the second code converter 101 has L L L at its input terminals a', b' and c' respectively. Therefore, as seen from Table 3, the output code appearing at its output terminals d' and e= is H L. Consequently, in accordance with the relation shown in Table 4 the third code converter 104 puts out a code of L H L so that the first switch selector circuit 11 turns the switch SW3 off and SW4 on. Also, the fourth code converter 105 produces a code of H L so that the second switch selector circuit 13 switches over the changeover SW2 to terminal p' in accordance with the relation shown in Table 1. At this time point, the input code of the memory 141 of the second code converter 101 remains L L L. As a result, the sensitivity of the photo multiplier 1 is increased one step and the output of the logarithmic converter 6 rises up to Vb shown in FIG. 3. After being delayed by the delay circuit 143, the output code H L is introduced into the terminals b' and c' of the memory 143.

Figure 3:
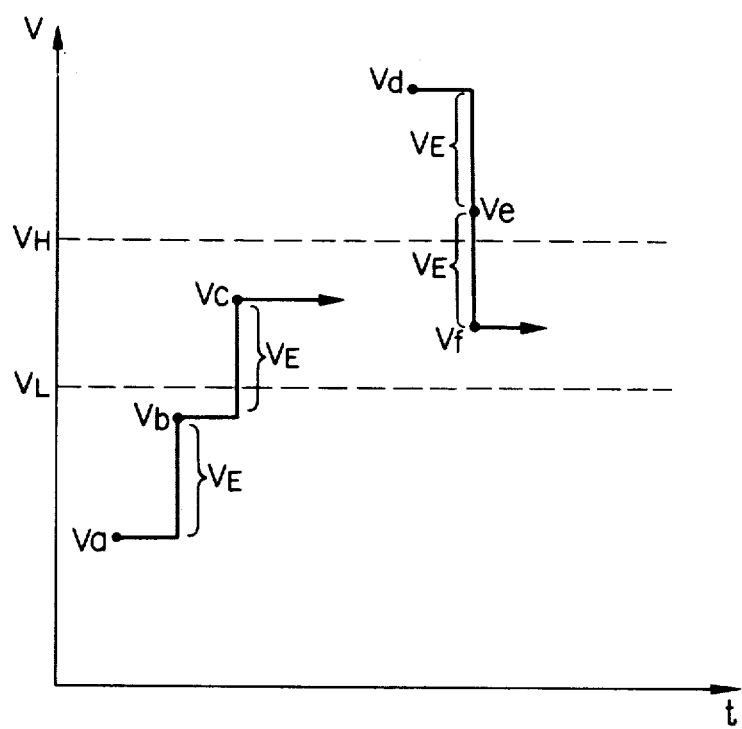
FIG. 3 is a diagram illustrating the manner of operation of the circuit according to the invention.

In connection with the output levels shown in FIG. 3, it should be noted that they are required to satisfy the condition, $V_H - V_L > Vb - Va$. At the time of the output of the logarithmic converter 6 being raised from Va to Vb, a signal corresponding to $V_E$ shown in FIG. 3 is applied to the exposure arithmetic unit 7 from the second correction coefficient output circuit 12b. At this time, however, the output of the second comparator 9 is L. Therefore, the second code converter 101 gives its output terminals D', e' an output code of L H in accordance with the relation shown in Table 3. Thereby, as seen from Table 4, a code L L H is issued from the third code converter 104. Consequently, the change-over switch SW4 is turned off and SW5 is turned on by the first switch selector circuit 11. Also, from the relation shown in Table 4, a code L H is issued from the fourth code converter 105. Thereby, the switch SW1 is switched over to terminal p in accordance with the relation shown in Table 1. As a result, the sensitivity of the photo multiplier 1 is further increased one more step. If the output of the logarithmic converter 6 is raised up to Vc (FIG. 3) by it, then the output of the second comparator 9 will become H and therefore the light emitting element will put off. Since the flip-flop 103 no longer changes its state, the control signal generator 10 becomes stable.

Preferably, $Vb - Va = Vc - Vb$ and at least it is necessary that $V_H - V_L > Vc - Vb$. Otherwise, the output of the logarithmic converter 6 will repeat only up-and down between the under-limit $V_H$ and the over-limit $V_L$ every changeover of the sensitivity.

The exposure arithmetic unit 7 receives a correction coefficient (that is a signal corresponding to 2 $V_E$ shown in FIG. 3) from the third correction coefficient output circuit 12c, an output from the logarithmic converter 6 and information of the film sensitivity from the film sensitivity setting device 14. From these input data, the exposure arithmetic unit carries out an arithmetic operation to determine a proper exposure time and causes the display unit 15 to display the determined exposure time. Thus, the photographer can know the proper exposure time, namely the shutter speed then set by reading the display on the display unit 15 at the time of light emitting elements 8b and 9b being off. By turning on a release button (not shown) the shutter control circuit 16 is opened for the proper exposure time.

The output level of the logarithmic converter 6 rises with increase of the incident light on the photo multiplier 1. When the output of the logarithmic converter 6 is at the level of Vd shown in FIG. 3, the output of the first comparator 8 is L and that of the second converter 9 is H. Therefore, the light emitting element 8b is put on to give warning that the output of the logarithmic converter is beyond the over-limit $V_H$. In this position, the flip-flop 103 within the control signal generator 10 is reset to allow the output of the first code converter 100 to pass through the multiplexer 102. If the output code of the first code converter 100 is L L, then the fourth code converter 105 also becomes L L. Therefore, the switch SW1 is switched over to terminal q and SW2 is to q'. Thereby the output of the logarithmic converter 6 is decreased to Vf as shown in FIG. 3. As a matter of course, if the output code of the first code converter 100 is L H, it is changed over to H L at the first step and then to L L after the output of the logarithmic converter has been increased to Vd. Thereafter, in the same manner as described above, it is decreased to Vf.

For all other cases, the apparatus operates in a similar manner to the above mentioned cases although the manner of operation is different case by case in accordance with the magnitude of luminance of the incident light and the sensitivity then set. The manner of operation of the apparatus for other possible cases will be obvious to those skilled in the art from the above description and therefore need not be further described.

Of course, if the quantity of light incident on the photo multiplier 1 is extremely small and the output of the logarithmic converter 6 can not reach a level above the under-limit $V_L$ even after the sensitivity of the photo multiplier 1 has been stepped up to its maximum, then the light emitting element 9b will continue to be on. This gives the photographer warning that the object is too dark to carry out automatic exposure. On the contrary, if the quantity of light incident on the photo multiplier 1 is extremely large and the output of the logarithmic converter 6 is beyond the over-limit even with the minimum sensitivity of the photo multiplier 1, then the light emitting element 8b will continue to be on to give warning that the object is too bright to perform automatic exposure.

Figure 6:
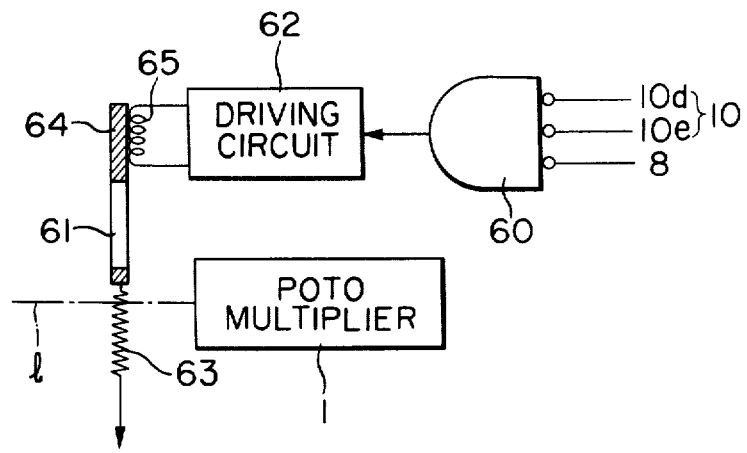
FIG. 6 shows an example of protecting means for photo multiplier.

In the latter case, if the apparatus is left standing under such extremely high brightness condition for a long time, the dynode and anode of the photo multiplier 1 may be damaged. To prevent such damage the photo multiplier is preferably protected by suitable protecting means. FIG. 6 shows an example of such protecting means for the photo multiplier.

In FIG. 6, the reference numeral 60 designates an AND gate and 61 is a ND filter. The reference numeral 62 is a driving circuit for ND filter 61. Output code L L from the output terminals 10d, 10e of the control signal generator 10 and output L of the first comparator 8 are introduced into the AND gate 60 which produces an AND signal by which the driving circuit 62 is driven to automatically insert the ND filter 61 into the optical path 1 in front of the photo multiplier 1. The reference numeral 63 is a spring which intends to move the ND filter 61 in the direction toward the optical path 1 as indicated by the arrow. The ND filter 61 has an iron frame 64 and the driving circuit 62 includes an electromagnet 65. The electromagnet 65 attracts the iron frame 64 to normally hold the filter 61 in the position against the biasing force of the spring 63. When the electromagnet 65 is deenergized in response to the AND signal, therefore, the filter is automatically inserted into the optical path 1 by the action of the spring 63. Protecting means may be formed also in such manner that a protecting circuit for the photo multiplier 1 can be brought into operation by the driving circuit 62.

While in the above embodiment, the sensitivity of the photo multiplier has been changed over through three steps, the number of the steps may be increased as desired. In such case, it is advisable that a computer be used as the control signal generator 10 so as to process signals in a fashion of "soft". Also, the width of range from over-limit $V_H$ to under-limit $V_L$ may be narrowed as compared with the above embodiment if the circuit for processing the output of photo multiplier has a narrower linearity region.

As readily understood from the foregoing, the present invention has many advantages over the prior art. According to the invention, an automatic correction to exposure value is performed interlocking with automatic change-over of the sensitivity of photo multiplier. This enables provision of a small and conveniently operable exposure control apparatus. Although the apparatus is small in size, it has a wide photometric range.

Also, since the output of the photo multiplier can be kept within a determined range as required at that time, it is no longer necessary to provide a broad dynamic range for signal processing circuits such as the logarithmic converter. This permits broad freedom in designing the circuits.

While the invention has been particularly shown and described with reference to preferred embodiments thereof, it will be understood by those skilled in the art that the foregoing and other changes in form and details can be made therein without departing from the spirit and scope of the invention.

I claim:

1. Apparatus for determining shutter speed in a photographing apparatus for a microscope, said apparatus comprising:
   (a) a photo multiplier for photo-electric conversion of the light transmitted through an objective lens and for producing the photo-electric conversion signal;
   (b) sensitivity changing means for stepwise changing the sensitivity of said photo multiplier;
   (c) correction coefficient output means having correction coefficients corresponding to each of steps of the sensitivity levels of said photo multiplier;
   (d) signal generating means having two reference levels, high and low and so formed as to generate a first signal when said photo-electric conversion signal is higher than said high reference level, generate a second signal when said photo-electric conversion signal is lower than said low reference level and generate a third signal when said photo-electric conversion signal is between said high and low reference levels;
   (e) control means for receiving as an input the signal produced by said signal generating means and for controlling said sensitivity changing means and correction coefficient output means, the control means controlling said sensitivity changing means so that the sensitivity of said photo multiplier is decreased during generation of said first signal so as to generate said third signal and so that the sensitivity of said photo multiplier is increased during generation of said second signal so as to produce said third signal, the control means controlling said correction coefficient output means in such a manner as to produce a correction coefficient corresponding to the set sensitivity of said photo multiplier; and
   (f) an arithmetic unit for receiving as an input said photo-electric conversion signal and the correction coefficient generated from said correction coefficient output means, and for determining a shutter speed corresponding to intensity of light incident always on said photo multiplier independent of the changing in the sensitivity of said photo multiplier.

2. Apparatus for determining shutter speed as set forth in claim 1, which further comprises first and second warning means by the output of said signal generating means, of which two warning means the first one is driven by said first signal and the second one is driven by said second signal.

3. Apparatus for determining shutter speed as set forth in claim 1, which further comprises means for protecting said photo multiplier against a high intensity light of incident light, said protecting means being connected to said signal generating means and control means and operable to protect said photo multiplier against the high intensity light when its sensitivity is at the minimum level and said first signal is being produced.

4. Apparatus for determining shutter speed in a photographing apparatus for a microscope, said apparatus comprising:
   (a) photo detecting means for photo-electric conversion of the light transmitted through an objective lens and for producing photo-electric conversion signal, the sensitivity of said photo detecting means being adjustable;
   (b) correction coefficient output means having correction coefficients corresponding to the sensitivity of said photo detecting means;
   (c) automatic control means for said photo detecting means and said correction coefficient output means, said automatic control means setting the sensitivity of said photo detecting means in such a manner that said photo-electric conversion signal always is in the predetermined range and controlling said correction coefficient output means so that the correction coefficient output means may produce an output of correction coefficient corresponding to the set sensitivity of said photo detecting means; and
   (d) an arithmetic unit for determining a proper shutter speed which corresponds to the intensity of light incident usually on said photo detecting means independent of the changing in the sensitivity of said photo detecting means, from the output of said photo detecting means and, in addition, from the output of said correction coefficient output means.

* * * * *

UNITED STATES PATENT AND TRADEMARK OFFICE
CERTIFICATE OF CORRECTION

PATENT NO. : 4,475,802
DATED : October 9, 1984
INVENTOR(S) : KENJI ONOGI

It is certified that error appears in the above-identified patent and that said Letters Patent is hereby corrected as shown below:

Column 1, line 34, change "fair by" to --fairly--;

line 46, change "fair by" to --fairly--.

Column 6, line 52, change "e=" to --e'--.
Column 7, line 10, change "D'" to --d'--.

Signed and Sealed this

Second Day of April 1985

[SEAL]

Attest:

DONALD J. QUIGG

*Attesting Officer*  *Acting Commissioner of Patents and Trademarks*